United States Patent
Pastore et al.

(10) Patent No.: US 10,242,363 B2
(45) Date of Patent: *Mar. 26, 2019

(54) SYSTEMS AND METHODS FOR PERFORMING PAYMENT CARD TRANSACTIONS USING A WEARABLE COMPUTING DEVICE

(71) Applicant: MASTERCARD INTERNATIONAL INCORPORATED, Purchase, NY (US)

(72) Inventors: Jeremy Michael Pastore, Brooklyn, NY (US); Michael Lester Zhao, New York, NY (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,840

(22) Filed: Nov. 14, 2017

(65) Prior Publication Data

US 2018/0068318 A1 Mar. 8, 2018

Related U.S. Application Data

(63) Continuation of application No. 14/456,843, filed on Aug. 11, 2014, now Pat. No. 9,818,114.

(51) Int. Cl.
*G06Q 20/40* (2012.01)
*G06Q 20/36* (2012.01)

(52) U.S. Cl.
CPC ..... *G06Q 20/40145* (2013.01); *G06Q 20/363* (2013.01)

(58) Field of Classification Search
CPC .............................................. G06Q 20/40145
USPC ....................................... 235/379; 705/5, 17
See application file for complete search history.

(56) References Cited

U.S. PATENT DOCUMENTS 4,641,349 A 2/1987 Flom et al.
5,291,560 A 3/1994 Daugman
(Continued)

FOREIGN PATENT DOCUMENTS

CN 101295357 A 10/2008
WO 0120561 A1 3/2001
(Continued)

OTHER PUBLICATIONS

International Search Report and Written Opinion for related Application No. PCT/US2015/043063, dated Sep. 30, 2015, 13 pp.

*Primary Examiner* — Allyson Trail
(74) *Attorney, Agent, or Firm* — Armstrong Teasdale LLP

(57) ABSTRACT

A computer-based method for authenticating a suspect consumer as an authorized cardholder during a payment card transaction is provided. The method includes registering the authorized cardholder within a portable computer device by receiving a reference sample of the authorized cardholder. The portable computer device includes a processor, a memory, and a camera. The method also includes storing, in the memory, the reference sample of the authorized cardholder and associated payment card information. The method further includes using the camera to capture a transaction sample of the suspect consumer during the payment card transaction using the camera. The method also includes comparing, by the processor, the transaction sample to the reference sample stored in the memory. The method further includes authenticating the suspect consumer as the authorized cardholder based at least in part on the comparison.

19 Claims, 11 Drawing Sheets

(56) References Cited

U.S. PATENT DOCUMENTS

| | | |
|---|---|---|
| 6,202,151 B1 | 3/2001 | Musgrave et al. |
| 6,213,391 B1 | 4/2001 | Lewis |
| 6,333,988 B1 | 12/2001 | Seal et al. |
| 6,532,298 B1 | 3/2003 | Cambier et al. |
| 7,130,454 B1 | 10/2006 | Berube et al. |
| 7,176,973 B2 | 2/2007 | Takada et al. |
| 7,369,759 B2 | 5/2008 | Kusakari et al. |
| 7,760,919 B2 | 7/2010 | Namgoong |
| 7,768,572 B2 | 8/2010 | Park |
| 8,494,961 B1 | 7/2013 | Lucas et al. |
| 2006/0008124 A1 | 1/2006 | Ewe et al. |
| 2008/0071587 A1 | 3/2008 | Granucci et al. |
| 2008/0281740 A1 | 11/2008 | Wu |
| 2011/0276486 A1 | 11/2011 | Kuba |
| 2012/0084206 A1 | 4/2012 | Mehew et al. |
| 2012/0148116 A1 | 6/2012 | Chae |
| 2012/0197743 A1 | 8/2012 | Grigg et al. |
| 2013/0147603 A1 | 6/2013 | Malhas et al. |
| 2013/0179285 A1 | 7/2013 | Lyle |
| 2013/0227561 A1 | 8/2013 | Walsh et al. |
| 2013/0290136 A1 | 10/2013 | Sheets et al. |
| 2013/0332365 A1 | 12/2013 | Evans et al. |
| 2014/0067679 A1 | 3/2014 | O'Reilly et al. |
| 2014/0172713 A1 | 6/2014 | Rosenberg |
| 2014/0183269 A1 | 7/2014 | Glaser |
| 2014/0184775 A1 | 7/2014 | Drake et al. |
| 2014/0214630 A1 | 7/2014 | Ganapathy et al. |
| 2015/0006305 A1 | 1/2015 | Randazza et al. |
| 2015/0019431 A1 | 1/2015 | Strasding et al. |
| 2015/0049922 A1 | 2/2015 | Miller |
| 2015/0054917 A1 | 2/2015 | Coon |
| 2015/0078629 A1 | 3/2015 | Gottemukkula et al. |
| 2015/0120543 A1 | 4/2015 | Carnesi, Sr. |
| 2015/0199682 A1 | 7/2015 | Kalgi et al. |
| 2015/0235212 A1 | 8/2015 | Ortiz et al. |
| 2015/0264567 A1 | 9/2015 | Sensharma et al. |
| 2015/0294303 A1 | 10/2015 | Hanson et al. |
| 2015/0317627 A1 | 11/2015 | Howe |
| 2015/0332273 A1 | 11/2015 | Bruno |
| 2015/0356351 A1 | 12/2015 | Saylor et al. |

FOREIGN PATENT DOCUMENTS

| | | |
|---|---|---|
| WO | 2008139631 A1 | 11/2008 |
| WO | 2012178186 A1 | 12/2012 |

SYSTEMS AND METHODS FOR PERFORMING PAYMENT CARD TRANSACTIONS USING A WEARABLE COMPUTING DEVICE

CROSS REFERENCE TO RELATED APPLICATIONS

This application is a continuation application of U.S. patent application Ser. No. 14/456,843, filed Aug. 11, 2013, which is incorporated by reference herein in its entirety.

BACKGROUND OF THE DISCLOSURE

This disclosure relates generally to payment card transactions and, more specifically, to systems and methods for performing payment card transactions using a wearable computing device of the purchasing consumer.

Conventional payment card transaction systems enable a cardholder to purchase goods or services from a merchant with their payment card, such as a debit card or a credit card. During retail transactions conducted at a merchant location, such as a "walk-in" storefront location, a paying consumer may wish to make a purchase with a payment card account, such as with a credit card, a debit card, a pre-paid card, etc. To execute a transaction, the consumer normally presents the physical payment card to the merchant at the time of purchase. The physical card identifies the particular payment account to be used during the transaction. The merchant (and other parties affiliated with the transaction) may presume that the underlying payment account is controlled by the consumer based on the consumer's demonstrated possession of the physical card (i.e., this person has the card, so the card must be theirs). However, physical cards may become lost, stolen, counterfeited, or otherwise abused by fraudulent third-parties. As such, possession of the payment card may not be a reliable indicator of underlying control or ownership of the payment account.

Secure execution of these payment account transactions require determining what underlying payment account to use for the transaction (i.e., account identification), as well as verifying that the consumer is authorized to use the underlying payment account (i.e., consumer authentication).

BRIEF DESCRIPTION OF THE DISCLOSURE

In one aspect, a computer-based method for authenticating a suspect consumer as an authorized cardholder during a payment card transaction is provided. The method includes registering the authorized cardholder within a portable computer device by receiving a reference sample of the authorized cardholder. The portable computer device includes a processor, a memory, and a camera. The method also includes storing, in the memory, the reference sample of the authorized cardholder and associated payment card information. The method further includes using the camera to capture a transaction sample of the suspect consumer during the payment card transaction using the camera. The method also includes comparing, by the processor, the transaction sample to the reference sample stored in the memory. The method further includes authenticating the suspect consumer as the authorized cardholder based at least in part on the comparison.

In another aspect, a portable computing device for authenticating a suspect consumer as an authorized cardholder during a payment card transaction is provided. The portable computing device includes a memory, a camera, and a processor communicatively coupled to the memory and the camera. The processor is programmed to register an authorized cardholder within said portable computer device by receiving a reference sample of the authorized cardholder. The processor is also programmed to store, in the memory, the reference sample of the authorized cardholder and associated payment card information. The processor is further programmed to use the camera to capture a transaction sample of a suspect consumer during a payment card transaction. The processor is also programmed to compare the transaction sample to the reference sample stored in the memory. The processor is further programmed to authenticate the suspect consumer as the authorized cardholder based at least in part on the comparison.

In yet another aspect, at least one non-transitory computer-readable storage media having computer-executable instructions embodied thereon is provided. When executed by at least one processor, the computer-executable instructions cause the processor to register an authorized cardholder within said portable computer device by receiving a reference sample of the authorized cardholder. The portable computer device includes a processor, a memory, and a camera. The computer-executable instructions also cause the processor to store, in the memory, a reference sample of the authorized cardholder and associated payment card information. The computer-executable instructions further cause the processor to use the camera to capture a transaction sample of a suspect consumer during a payment card transaction using a camera communicatively coupled to the processor. The computer-executable instructions also cause the processor to compare the transaction sample to the reference sample in the memory. The computer-executable instructions further cause the processor to authenticate the suspect consumer as the authorized cardholder based at least in part on the comparison.

In yet another aspect, a computing device for authenticating a suspect consumer as an authorized cardholder during a payment card transaction is provided. The computing device includes a processor communicatively coupled to a memory and a portable computing device. The computing device is programmed to register an authorized cardholder within said computing device by receiving a reference sample of the authorized cardholder from the portable computer device and associating payment card information with the reference sample. The reference sample is collected from the authorized cardholder by a camera of the portable computing device. The computing device is also programmed to store, in the memory, the reference sample and the payment card information. The computing device is further programmed to receive an authentication request including a transaction sample of the suspect consumer and transaction payment card information. The computing device is also programmed to compare the transaction sample to the reference sample. The computing device is further programmed to authenticate the suspect consumer as the authorized cardholder based at least in part on the comparing.

BRIEF DESCRIPTION OF THE DRAWINGS

FIG. 1 is a schematic diagram illustrating an example multi-party transaction card industry system for authorizing payment card transactions and, more specifically, for performing payment card transactions using a wearable computing device.

FIG. 2 is a simplified block diagram of an example payment processing system for processing payment card transactions using a cardholder's portable computing device, such as a wearable computing device.

FIG. 3 is an expanded block diagram of an example embodiment of a server architecture of a transaction processing system including a portable computing device such as wearable, as well as other computer devices in accordance with one embodiment of the present disclosure.

FIG. 4 illustrates an example configuration of a user system operated by a user, such as the cardholder shown in FIG. 1.

FIG. 5 illustrates an example configuration of a server system such as server system shown in FIGS. 2 and 3.

FIG. 6 is an example diagram of a wearable computing device (referred to herein as a "wearable") that may be used to conduct a payment card transaction in the environment shown in FIG. 1.

FIG. 7 is an example payment transaction flow diagram for processing a payment card transaction using a portable computing device and the system shown in FIG. 2 in the transaction environment shown in FIG. 1.

FIG. 8 is another example payment transaction flow diagram for processing a payment card transaction using a portable computing device and the system shown in FIG. 2 in the transaction environment shown in FIG. 1.

FIG. 9 is yet another example payment transaction flow diagram for processing a payment card transaction using a portable computing device and the system shown in FIG. 2 in the transaction environment shown in FIG. 1.

FIG. 10 is an example method for performing a payment card transactions using the wearable shown in FIGS. 2, 3, and 6-9 in the transaction environment shown in FIG. 1.

FIG. 11 shows an example configuration of a database within a computing device, along with other related computing components, that may be used to perform payment card transactions using a wearable computing device.

Like numbers in the Figures indicate the same or functionally similar components.

DETAILED DESCRIPTION OF THE DISCLOSURE

Figure 1:
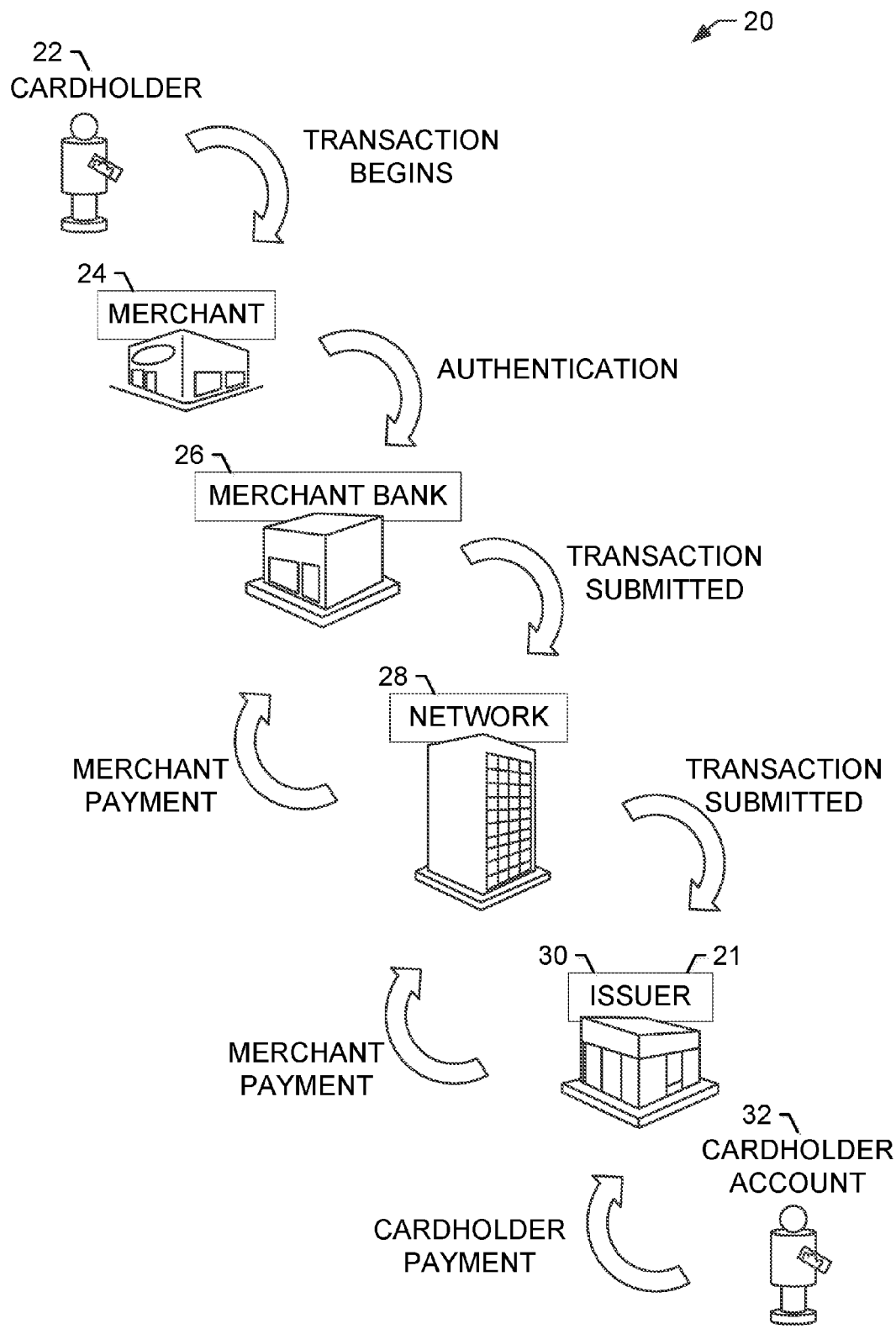
FIGS. 1-11 show example embodiments of the methods and systems described herein.

Systems and methods are described herein for performing payment card transactions using a wearable computing device. More specifically, the systems and methods described herein enable an authorized cardholder to conduct a payment card transaction using a wearable computing device ("wearable") and a mobile wallet. In the example embodiment, the wearable is a head-mounted device that includes a rear-facing camera oriented to view the consumer's face. The wearable also includes a mobile wallet application and a wireless communication device configured to interact with a nearby point-of-sale (POS) device.

During a configuration stage, the cardholder registers a "reference biometric sample" (or just "reference sample") of their iris. This reference sample represents the approved cardholder's iris that is used to determine whether or not a "suspect consumer" (i.e., a person attempting to conduct a payment card transaction) is the approved cardholder (a process generally referred to herein as "authentication"). During the payment card transaction, the camera on the wearable collects a biometric sample of the suspect consumer's iris (a "transaction biometric sample", or just "transaction sample"). In some embodiments, the transaction sample is a static image of the wearer's iris. In other embodiments, the transaction sample includes iris motion data of the wearer's iris, or a facial image of the wearer. The transaction sample is compared to the reference sample for authentication of the suspect consumer.

In some embodiments, the reference sample is stored locally on the wearable, and the comparison processing is performed by the wearable ("local authentication"). In other embodiments, the reference sample is stored remotely (e.g., at the payment processing network), and the transaction sample is transmitted to the payment processing network for authentication ("network authentication"). A POS terminal receives the transaction sample from the wearable and transmits the transaction sample along with encrypted payment card information to the payment processing network. In other network authentication embodiments, the wearable transmits the transaction sample and payment card information directly to the payment processing network, receives an identity authentication response from the network, and transmits the authorization response to the point-of-sale terminal.

A technical effect of the systems and processes described herein include at least one of: (a) registering the authorized cardholder within a portable computer device by receiving a reference sample of the authorized cardholder; (b) storing, in the memory, the reference sample of the authorized cardholder and associated payment card information; (c) using the camera to capture a transaction sample of the suspect consumer during the payment card transaction using the camera; (d) comparing, by the processor, the transaction sample to the reference sample stored in the memory; (e) authenticating the suspect consumer as the authorized cardholder based at least in part on the comparison; (f) using the camera to capture the reference sample of the authorized cardholder; (g) transmitting authentication information and payment card information to a point of sale device of a merchant associated with the payment card transaction; (h) the portable computer device receiving a prompt from a point of sale device to authenticate the suspect consumer after the suspect consumer initiates the payment card transaction; (i) the portable computer device is configured to respond to the prompt by causing the camera to capture the transaction sample; (j) capturing one or more of an iris image and an iris motion of the authorized cardholder; (k) the portable computing device transmitting a message to a point of sale device that the suspect consumer has been authenticated as the authorized cardholder; and (l) the point of sale device generating and transmitting a transaction authorization request message to an issuing bank associated with the payment card including an indicator that authentication has occurred.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium.

In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions and, more specifically, for performing payment card transactions using a wearable computing device (not shown in FIG. 1). Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

In some embodiments, cardholder 22 has a mobile computing device (not shown in FIG. 1) on his or her person at the time of a payment card transaction. The mobile computing device includes a camera device that is configured to capture a biometric sample of the cardholder 22 that is used to authenticate the cardholder 22 during the payment card transaction. The mobile computing device also includes a wireless networking device that is configured to interact with a point of sale (POS) device (not shown in FIG. 1) at the merchant 24 or a remote server associated with the transaction card industry system 20.

Figure 2:
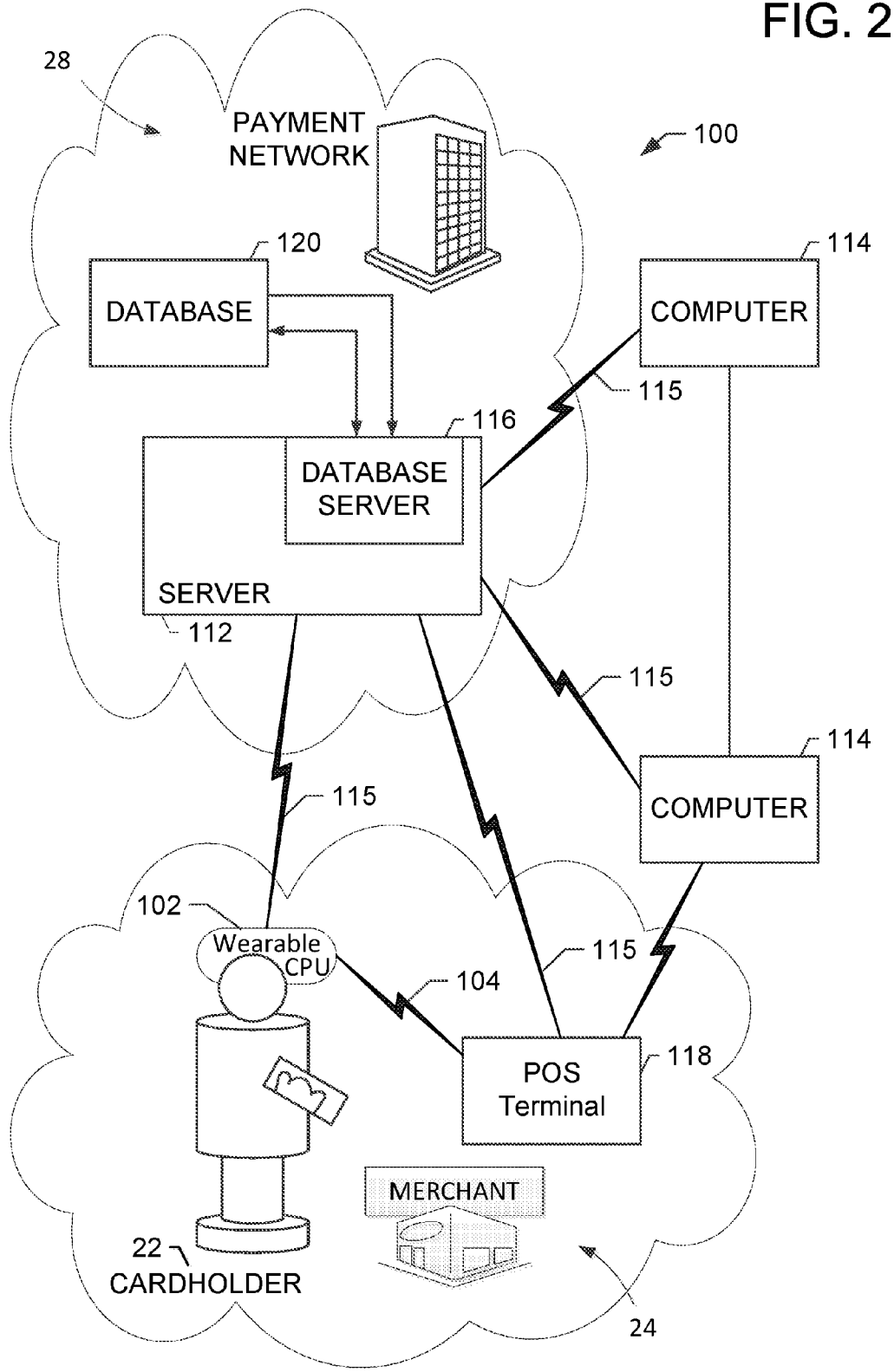

FIG. 2 is a simplified block diagram of an example payment processing system 100 for processing payment card transactions using a cardholder's 22 portable computing device, such as a wearable computing device 102 (or just "wearable 102"). System 100 includes a plurality of computer devices connected in communication in accordance with the present disclosure. In the example embodiment, system 100 may be used for conducting payment card transactions in the interchange environment shown in FIG. 1.

More specifically, in the example embodiment, system 100 includes a server system 112 of, for example, a payment processing network 28, in communication with a point-of-sale (POS) terminal 118 at a merchant location 24, and/or other client systems 114 associated with merchants, merchant banks, payment networks, and/or issuer banks. Server system 112 is also in communication with a plurality of client sub-systems, also referred to as client systems 114. In one embodiment, client systems 114 are computers including a web browser, such that server system 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment.

In the example embodiment, system 100 also includes POS terminals 118, which may be connected to client systems 114 and may be connected to server system 112. POS terminals 118 may be interconnected to the Internet (or any other network that allows the POS terminals 118 to communicate as described herein) through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a cardholder's financial transaction card. In some embodiments, POS terminal 118 may be a cardholder's personal computer, such as when conducting an online purchase through the Internet. As used herein, the terms POS device, POS terminal, and point of interaction device are used broadly, generally, and interchangeably to refer to any device in which a cardholder interacts with a merchant to complete a payment card transaction.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, account holders or customers, issuers, acquirers, savings amounts, savings account information, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information.

Database 120 may also store purchase data associated with items being purchased by a cardholder from a merchant, and authorization request data. Database 120 may also store liability acceptance information associated with parties to the transaction, such as merchants, merchant banks, payment networks, and/or issuer banks. Further, database 120 may also store rules for default liability and/or liability acceptance indicators for particular transactions.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28 or a payment processor. In the example embodiment, server system 112 is associated with a network interchange, such as interchange network 28, and may be referred to as an interchange computer system or a payment processing computing device. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, a token requestor, a token provider, and/or a biller.

In some embodiments, wearable computing device 102 includes a wireless networking component, such as Wi-Fi (e.g., wireless local area network), that enables wearable computing device 102 to communicate with a nearby POS terminal 118 or other computer system through a wireless network 104. In other embodiments, wearable computing device 102 includes a near field communications component that enables wearable computing device 102 to communicate through a wide area network or the Internet (e.g., network 115) with server system 112. As described in greater detail below, wearable computing device 102 may interact with server system 112 and/or POS terminal 118 during a payment card transaction.

Figure 3:
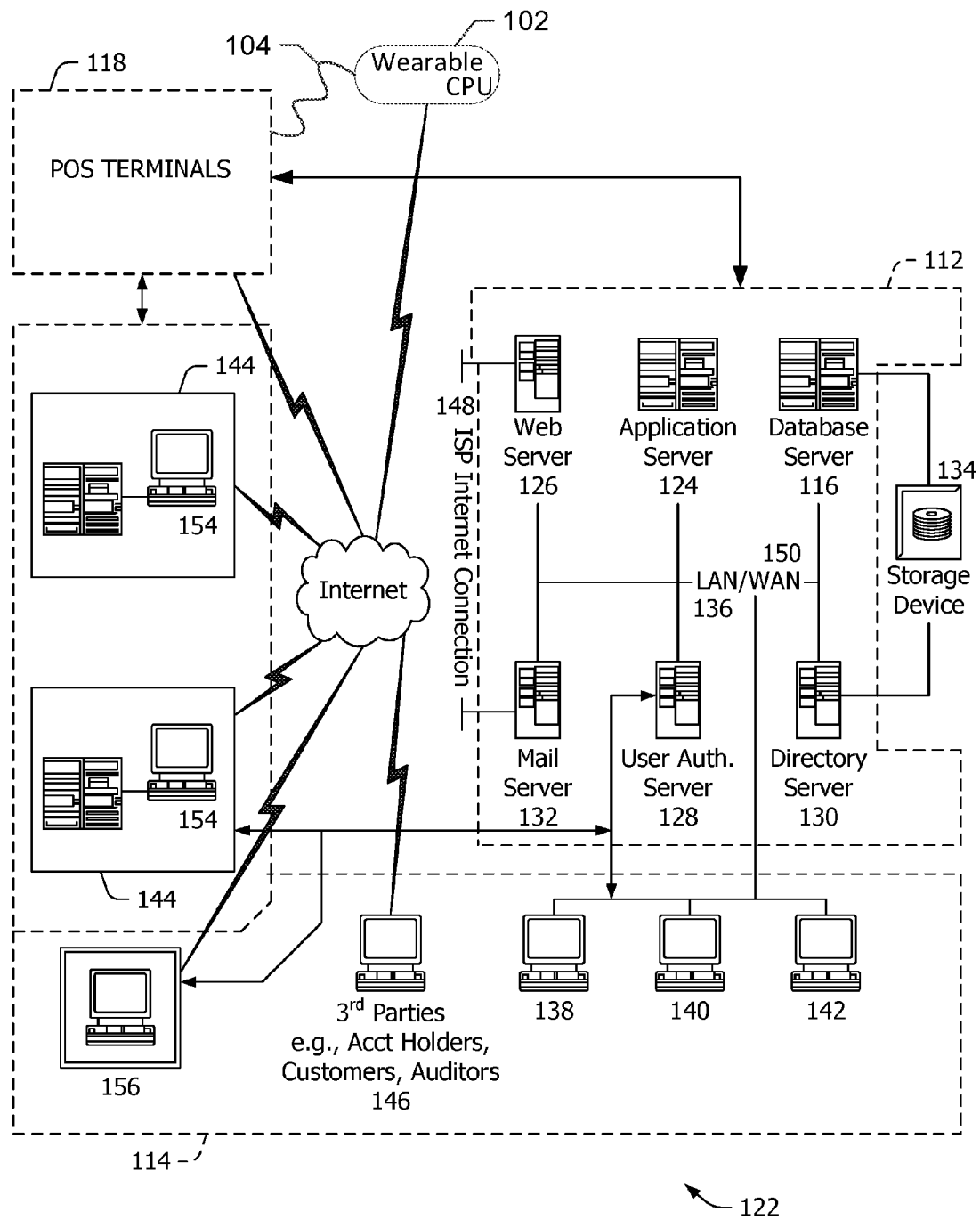

FIG. 3 is an expanded block diagram of an example embodiment of a server architecture of a transaction processing system 122 including a portable computing device such as wearable 102, as well as other computer devices in accordance with one embodiment of the present disclosure. Components in system 122, identical to components of system 100 (shown in FIG. 2), are identified in FIG. 3 using the same reference numerals as used in FIG. 2. Transaction processing system 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, cardholders (i.e., consumers), merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

In some embodiments, wearable 102 is communicatively coupled to server system 112 and other computing devices of system 122 through the Internet. In other embodiments, wearable 102 is communicatively coupled to POS terminal 118, and POS terminal 118 communicates with server system 112.

Figure 4:
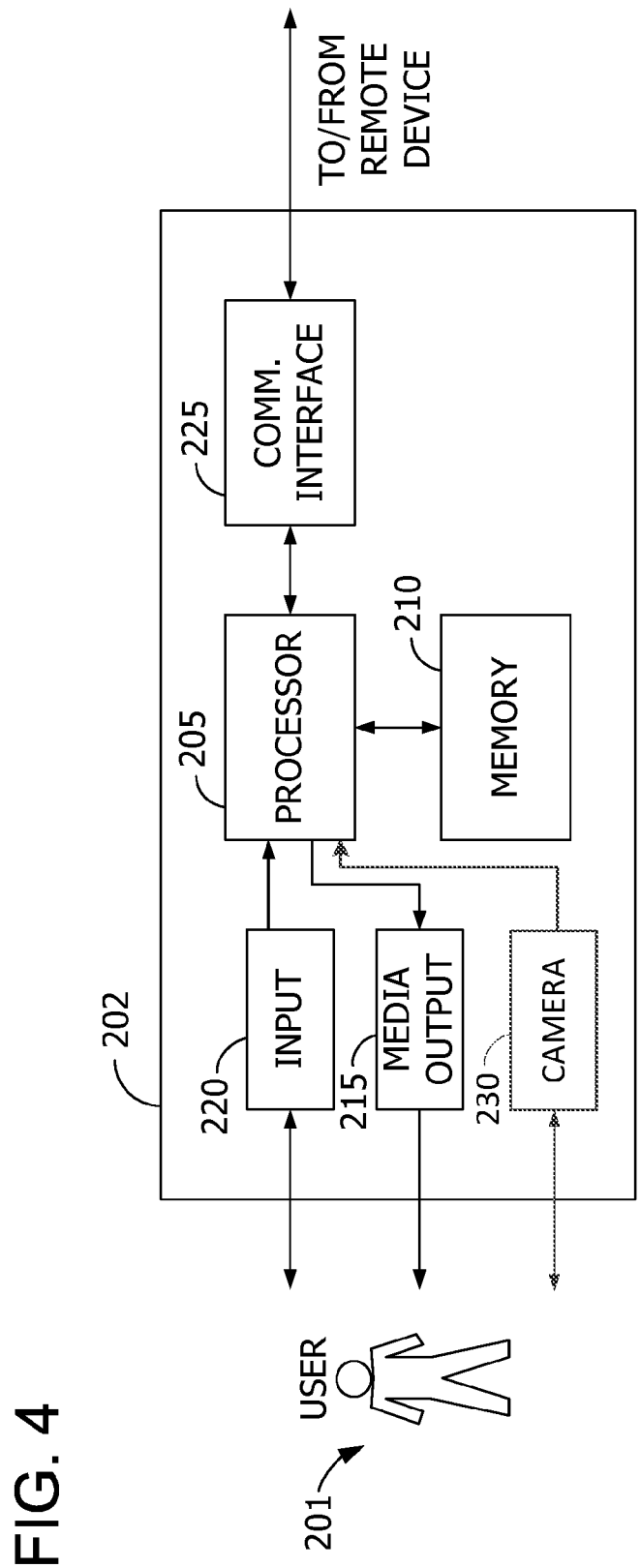

FIG. 4 illustrates an example configuration of a user system 202 operated by a user 201, such as cardholder 22 (shown in FIG. 1). In some embodiments, user system 202 is a portable computing device such as wearable 102 (shown in FIGS. 2 and 3). In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a web site from server system 112. A client application allows user 201 to interact with a server application from server system 112.

In the example embodiment, computing device 202 is a head-mounted, wearable computing device that includes a camera device 230 configured to capture facial biometric samples of the wearer (e.g., user 201), such as an iris image or iris motion of the wearer. Communications interface 225 transmits and receives data wirelessly to a remote system server such as, for example, server system 112 (shown in FIGS. 2 and 3), and/or to a nearby point-of-sale device such as POS device 118 (shown in FIGS. 2 and 3). In some embodiments, memory 210 stores a biometric reference image or sample of user 201 that is used to authenticate user 201 during a payment card transaction. In other embodiments, processor 205 is configured to receive, through camera 230, facial actions such as iris movement and interpret such movements as actions in conjunction with a payment card transaction.

Figure 5:
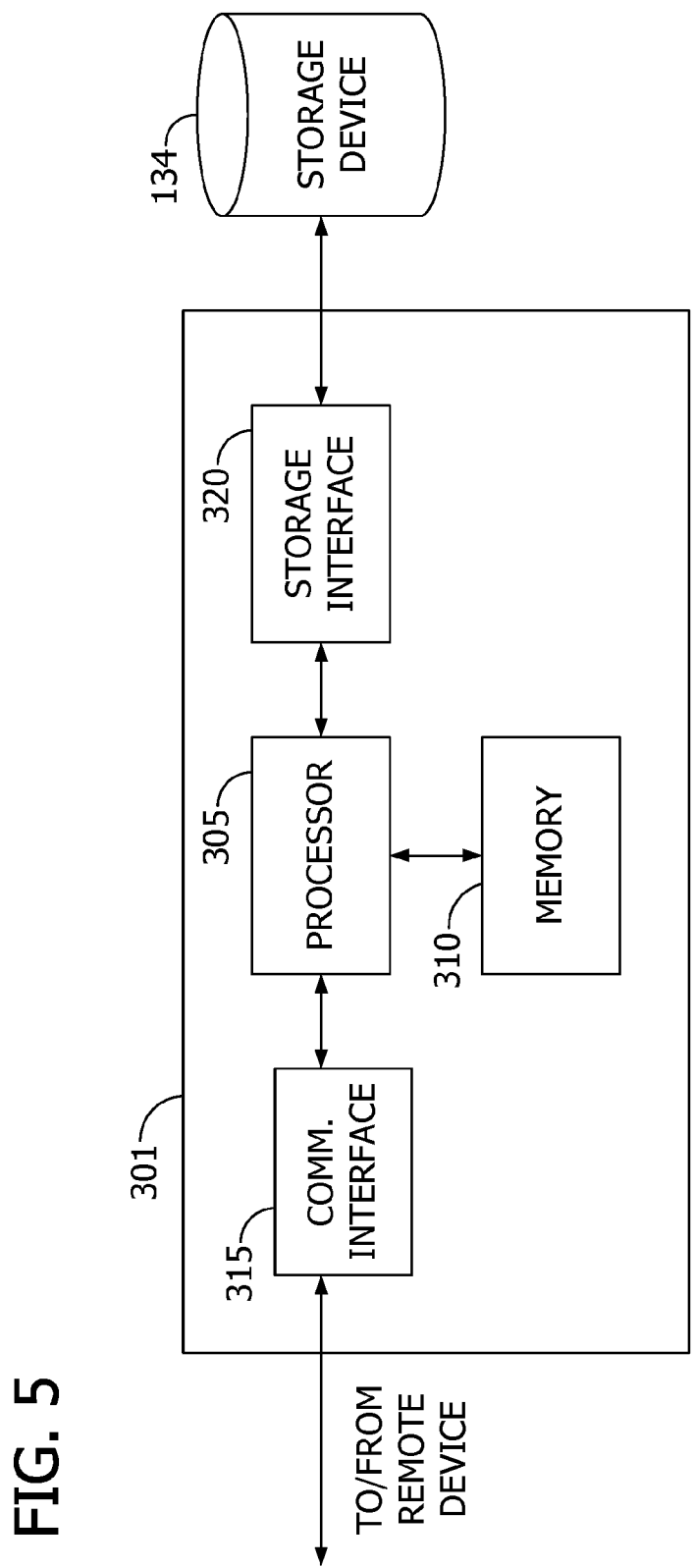

FIG. 5 illustrates an example configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as user system 202 (shown in FIG. 4) or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In one example embodiment, server system 301 receives biometric sample data of a suspect consumer from wearable 102 (shown in FIGS. 2 and 3) during a payment card transaction. Storage device 134 includes a reference image of, for example, cardholder 22, along with other account data for a payment card. Processor 305 compares the biometric sample data of the suspect consumer to the reference image associated with the payment card. If the sample image approximately matches the reference image, server system 301 authenticates the suspect consumer as the authorized cardholder.

Figure 6:
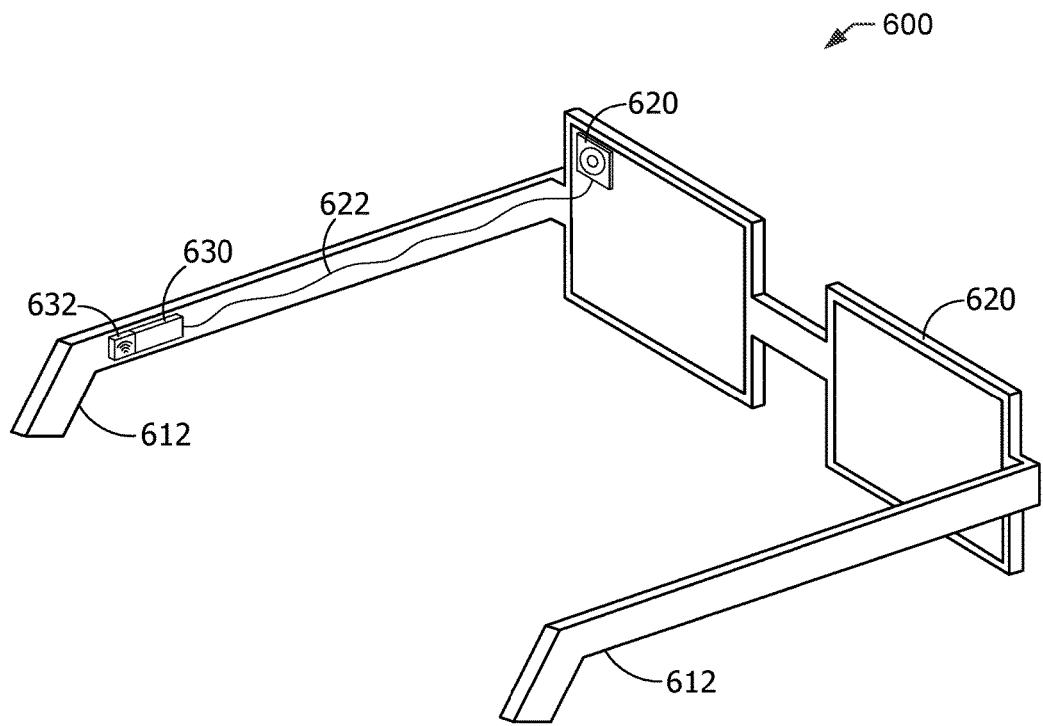

FIG. 6 is an example diagram of a wearable computing device (referred to herein as a "wearable") 600 that may be used to conduct a payment card transaction in the environment shown in FIG. 1. In the example embodiment, wearable 600 includes a pair of spectacles 610 that may be worn on the head of a user such as cardholder 22 (shown in FIGS. 1 and 2). Wearable 600 also includes a computing device 630 fixedly attached to a frame 612 of the spectacles 610. In some embodiments, computing device 630 is similar to user system 202 (shown in FIG. 4) and/or wearable 102 (shown in FIGS. 2 and 3). Computing device 630 also includes a wireless networking device 632 for wirelessly communicating with a nearby POS device such as POS device 118 (shown in FIGS. 2 and 3) or a remote server such as server system 112 (shown in FIGS. 2 and 3).

Computing device 630, in the example embodiment, is communicatively connected to a camera device 620 via a wire 622 extending along frame 612. Camera 620 is oriented toward the face of the wearer. More specifically, camera 620 is positioned and angled such that the left eye's iris of the wearer is centered in the field of view of camera 620 such that camera 620 can, for example, capture an iris image of the wearer's left eye. In some embodiments, camera 620 is positioned on spectacles 610 such as not to obscure the center of vision of the wearer. In other embodiments, camera 620 and/or computing device 630 are mounted to a right frame of spectacle, or in any way such as to enable the systems and methods described herein.

Figure 7:
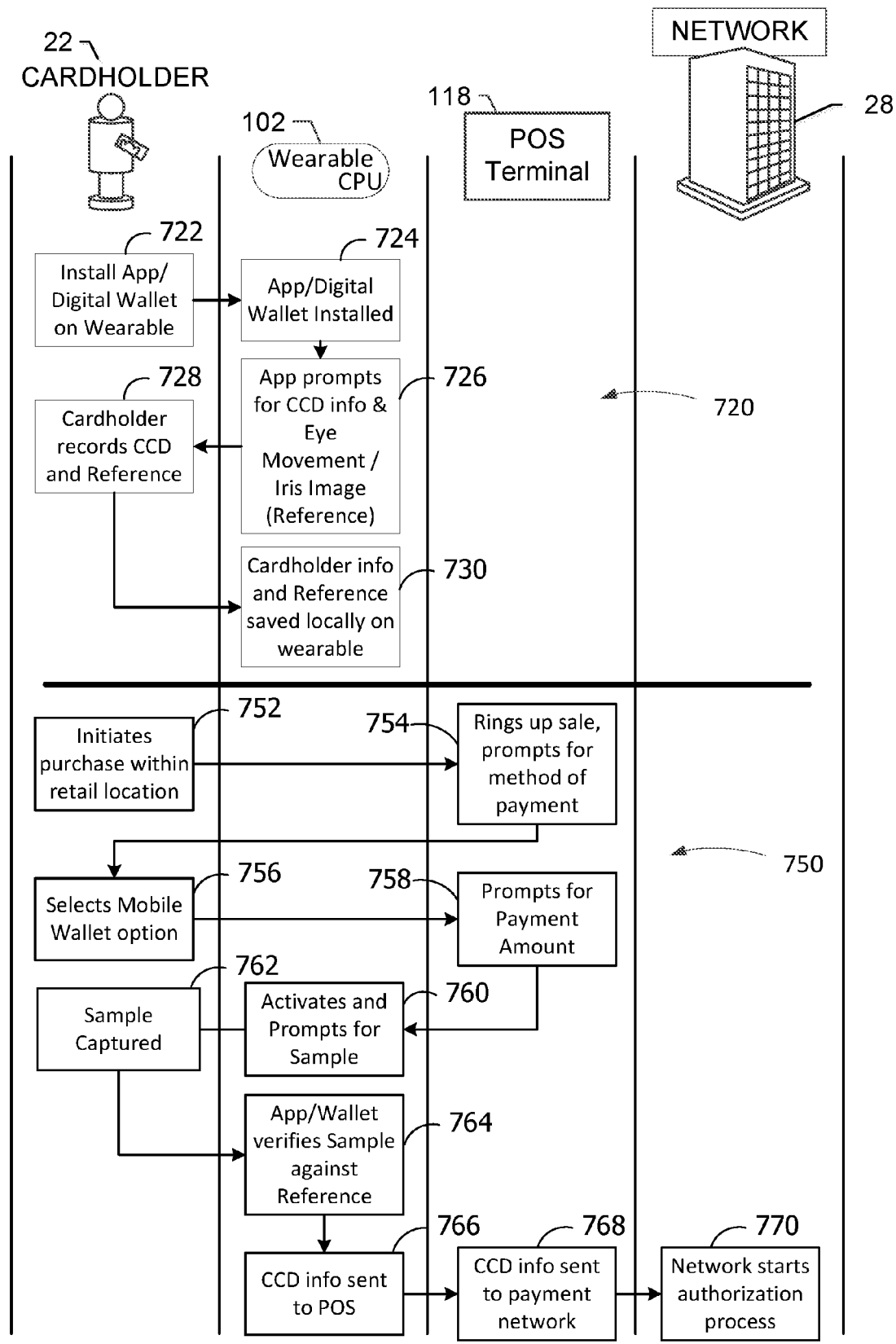
Figure 8:
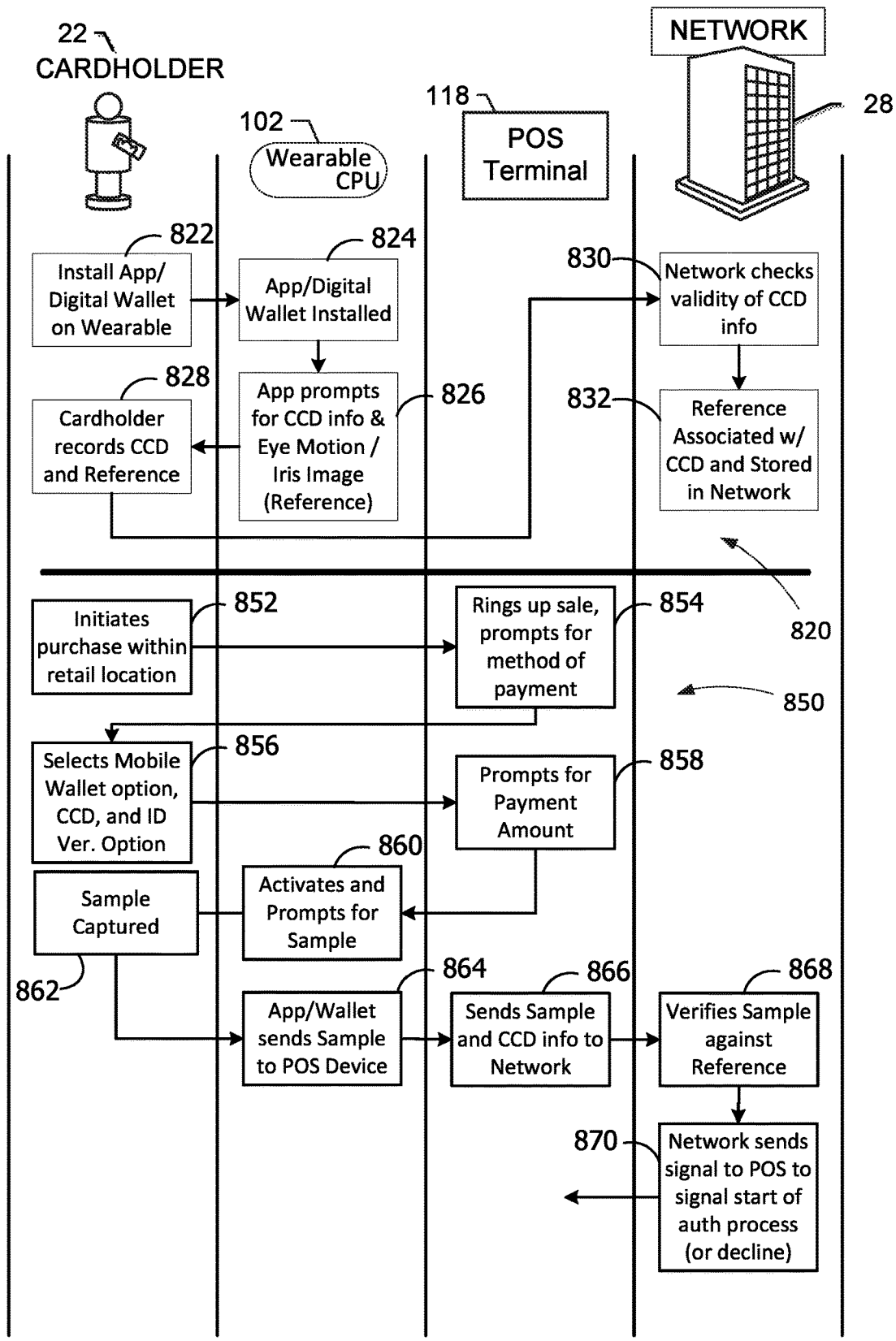
Figure 9:
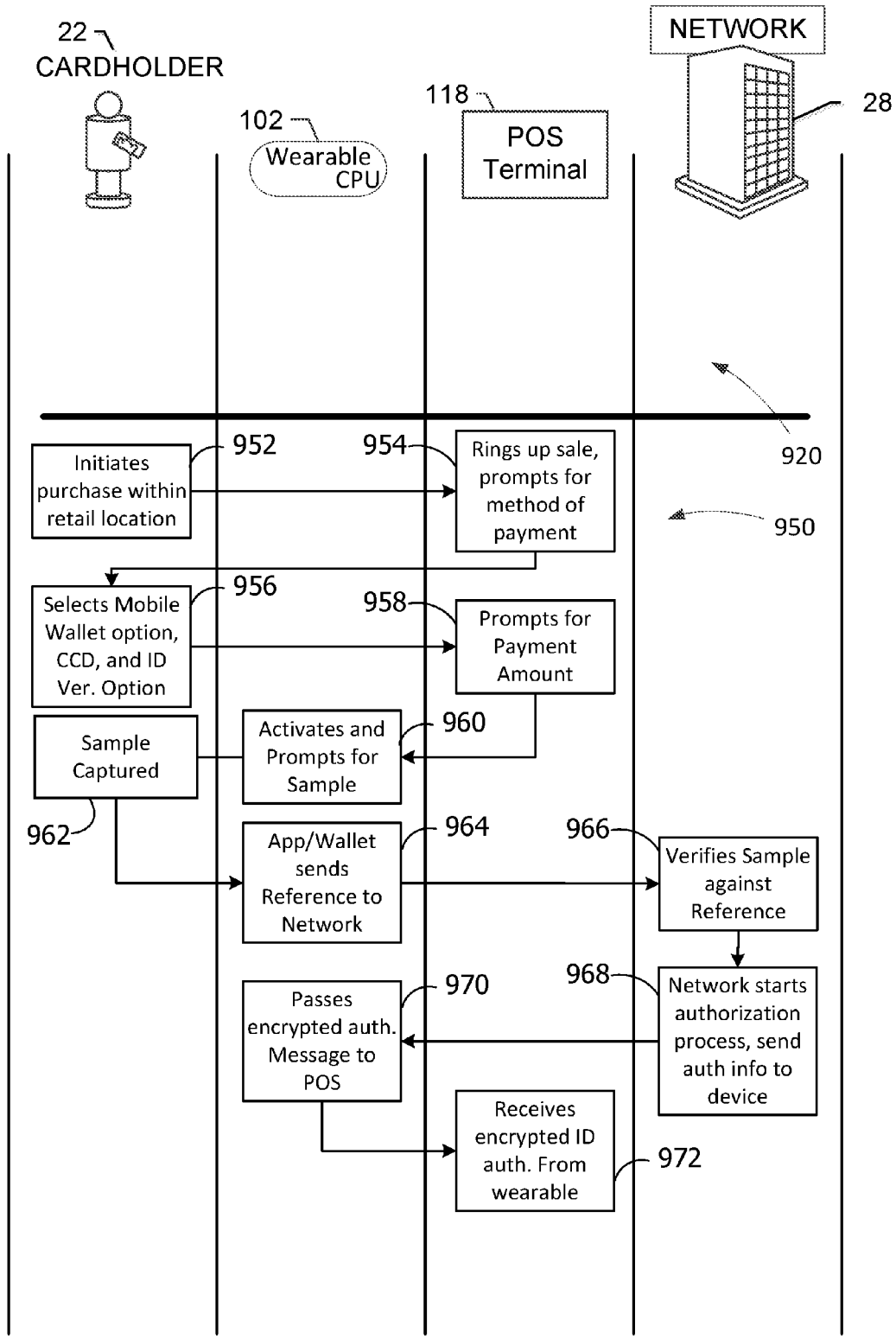

FIGS. 7, 8 and 9 illustrate example embodiments in which cardholder 22 engages in a payment card transaction using a portable computing device such as wearable 102. Each process also involves a merchant's POS device 118 and payment processing network 28. Generally speaking, FIG. 7 describes a process in which the wearable performs identity verification (e.g., the authentication function), FIG. 8 describes a process in which the POS device interacts with the wearable and the network to accomplish identity verification, and FIG. 9 describes a process in which the wearable interacts directly with the network to perform identity verification.

FIG. 7 is an example payment transaction flow diagram 700 for processing a payment card transaction using a portable computing device, for example, using system 100 (shown in FIG. 2) in transaction environment 20 (shown in FIG. 1). In the example embodiment, the payment card transaction involves cardholder 22, wearable 102, POS terminal 118, and payment processing network 28. Cardholder 22 first engages in a registration process 720 prior to executing a payment transaction process 750. Generally speaking, registration process 720 configures aspects of system 100 (shown in FIG. 2) that assist or otherwise enable aspects of execution of payment transaction process 750.

In the example embodiment, registration process 720 includes installing an application ("app") on wearable 102 at step 722 or otherwise configuring wearable 102 with computer-executable instructions capable of performing the steps as described herein. In some embodiments, the app includes a digital wallet functionality configured to store payment card information and other personal information for payment card accounts of cardholder 22. In the example embodiment, the app also includes a biometric module configured to capture one or more of an iris image of cardholder 22 and an iris movement or motion pattern of cardholder 22 (or any wearer of wearable 102).

Once the app and digital wallet are installed at step 724, in the example embodiment, the app prompts cardholder 22 for payment card information ("CCD info") as well as one or more of an iris image and eye movement at step 726. In some embodiments, the app utilizes camera 620 (shown in FIG. 6) of wearable 102 to capture one or more reference samples of cardholder 22 (e.g., the iris image data and/or iris motion data, referred to as just "Reference" in FIGS. 7-9). The term "reference sample", as used herein, refers to any biometric sample collected from the authorized cardholder 22 (i.e., the person(s) privileged to the underlying account associated with a payment card). During operation, these one or more reference samples may be used to authenticate a suspect consumer during a later payment card transaction.

In the example embodiment, cardholder 22 provides payment card information and other associated personal information ("CCD", in FIG. 7) at step 728. Also at step 728, cardholder 22 provides the reference sample(s). For example, wearable 102 may prompt cardholder 22 for, and collect, a static image of the iris of cardholder 22 and/or an iris motion of cardholder 22. At step 730, wearable 102 collects and stores CCD information and reference samples locally on wearable 102 for use during payment transaction process 750.

During a later payment card transaction, in the example embodiment, cardholder 22 uses wearable 102 (and the installed app) to conduct payment transaction process 750. At step 752, a suspect consumer (i.e., a person not yet authenticated as cardholder 22) initiates a purchase of goods or services with a merchant having a POS terminal 118. In the example embodiment, POS terminal 118 tabulates purchase details for the transaction and prompts cardholder 22 for a method of payment at step 754. Cardholder selects a "mobile wallet" option (e.g., paying with wearable 102) at step 756. At step 758, POS terminal 118 engages wearable 102 and the associated digital wallet and prompts wearable 102 for payment amount and authentication.

At step 760 of the example embodiment, wearable 102 activates and prompts the suspect consumer (i.e., the wearer of wearable 102) for a biometric sample (e.g., iris image or iris motion). At step 762, a transaction sample is captured by wearable 102 (e.g., the iris image data and/or iris motion data of the suspect consumer, referred to as just "Sample" in FIGS. 7-9). As used herein, the term "transaction sample" is used generally to refer to a biometric sample collected at the time of a payment card transaction. A transaction sample may, for example, be used as the suspect sample to compare against the previously-stored reference sample for authentication of the suspect consumer as the privileged cardholder 22. An iris image sample may be compared against a stored image of the privileged cardholder 22. An iris motion sample may be compared to iris motion data of the privileged cardholder 22 previously captured and stored. In some embodiments, both iris image and iris motion may be used to authenticate the suspect consumer. For example, iris motion may be used as a secondary authentication check. It may be possible to trick the iris image authentication, such as through use of a high-resolution picture of the privileged cardholder's 22 iris. As such, iris motion as a secondary check may provide an additional layer of security.

At step 764, wearable 102 performs the authentication function for the payment card transaction. More specifically, wearable 102 compares the transaction sample of the suspect consumer to the previously-collected and stored reference sample(s). If the transaction sample suitably matches the reference sample (e.g., within some pre-defined threshold of comparison), wearable 102 authenticates the suspect consumer as cardholder 22 and, at step 766, wearable 102 transmits payment card information associated with the transaction to POS terminal 118. POS terminal 118 subsequently transmits the payment card information to network 28 and, at step 770, network 28 starts the typical authorization process for the payment card transaction. As such, wearable 102 performs the authentication function for the payment card transaction under this embodiment.

FIG. 8 is an example payment transaction flow diagram 800 for processing a payment card transaction using a portable computing device, for example, using system 100 (shown in FIG. 2) in transaction environment 20 (shown in FIG. 1). In the example embodiment, the payment card transaction involves cardholder 22, wearable 102, POS terminal 118, and payment processing network 28. Cardholder 22 first engages in a registration process 820 prior to executing a payment transaction process 850. Generally speaking, registration process 820 configures aspects of system 100 (shown in FIG. 2) that assist or otherwise enable aspects of execution of payment transaction process 850.

In the example embodiment, registration process 820 includes installing an application ("app") on wearable 102 at step 822 or otherwise configuring wearable 102 with computer-executable instructions capable of performing the steps as described herein. In some embodiments, the app includes a digital wallet functionality configured to store payment card information and other personal information for payment card accounts of cardholder 22. In the example embodiment, the app also includes a biometric module configured to capture one or more of an iris image of cardholder 22 and an iris movement or motion pattern of cardholder 22 (or any wearer of wearable 102).

Once the app and digital wallet are installed at step 824, in the example embodiment, the app prompts cardholder 22 for payment card information ("CCD info") as well as one or more of an iris image and eye movement at step 826. In some embodiments, the app utilizes camera 620 (shown in FIG. 6) of wearable 102 to capture one or more reference samples of cardholder 22.

In the example embodiment, cardholder 22 provides payment card information and other associated personal information ("CCD", in FIG. 8) at step 828. Also at step 828, cardholder 22 provides the reference sample(s). For example, wearable 102 may prompt cardholder 22 for, and collect, a static image of the iris of cardholder 22 and/or an iris motion of cardholder 22. Wearable 102 subsequently transmits the CCD information and the reference sample(s) to network 28. At step 830, network 28 checks the validity of the CCD information and, at step 832, network 28 stores the reference sample(s) and associates these reference samples with the provided payment cards and other CCD information for use during payment transaction process 850.

During a later payment card transaction, in the example embodiment, cardholder 22 uses wearable 102 (and the installed app) to conduct payment transaction process 850. At step 852, a suspect consumer initiates a purchase of goods or services with a merchant having a POS terminal 118. In the example embodiment, POS terminal 118 tabulates purchase details for the transaction and prompts cardholder 22 for a method of payment at step 854. Cardholder selects a "mobile wallet" option (e.g., paying with wearable 102), selects the payment card with which he/she desires to pay, and selects an identification verification option at step 856. At step 858, POS terminal 118 engages wearable 102 and the associated digital wallet and prompts wearable 102 for payment amount and authentication.

At step 860 of the example embodiment, wearable 102 activates and prompts the suspect consumer (i.e., the wearer of wearable 102) for a biometric sample (e.g., iris image or iris motion). At step 862, a transaction sample is captured by wearable 102 (e.g., the iris image data and/or iris motion data of the suspect consumer). At step 864, wearable 102 transmits the transaction sample to POS terminal 118 and, as step 866, POS terminal 118 subsequently transmits the payment card information and the transaction sample to network 28.

At step 868, network 28 performs the authentication function. More specifically, wearable 102 compares the transaction sample of the suspect consumer to the previously-collected and stored reference sample(s). If the transaction sample suitably matches the reference sample (e.g., within some pre-defined threshold of comparison), network 28 authenticates the suspect consumer as cardholder 22 and, at step 870, network 28 sends a signal to POS terminal 118 to signal the start of the authorization process (or authentication decline) for the payment card transaction. As such, network 28 performs the authentication function for the payment card transaction under this embodiment, with POS terminal 118 acting as the transmission gateway for the transaction sample.

FIG. 9 is an example payment transaction flow diagram 900 for processing a payment card transaction using a portable computing device, for example, using system 100 (shown in FIG. 2) in transaction environment 20 (shown in FIG. 1). In the example embodiment, the payment card transaction involves cardholder 22, wearable 102, POS terminal 118, and payment processing network 28. Cardholder 22 first engages in a registration process 920 prior to executing a payment transaction process 950. Generally speaking, registration process 920 configures aspects of system 100 (shown in FIG. 2) that assist or otherwise enable aspects of execution of payment transaction process 950. In the example embodiment, registration process 920 is similar to registration process 820 (shown in FIG. 8). In other words, the reference sample(s) for cardholder 22 are collected and stored at network 28.

During a later payment card transaction, in the example embodiment, cardholder 22 uses wearable 102 (and the installed app) to conduct payment transaction process 950. At step 952, a suspect consumer initiates a purchase of goods or services with a merchant having a POS terminal 118. In the example embodiment, POS terminal 118 tabulates purchase details for the transaction and prompts cardholder 22 for a method of payment at step 954. Cardholder selects a "mobile wallet" option (e.g., paying with wearable 102), selects the payment card with which he/she desires to pay, and selects an identification verification option at step 956. At step 958, POS terminal 118 engages wearable 102 and the associated digital wallet and prompts wearable 102 for payment amount and authentication.

At step 960 of the example embodiment, wearable 102 activates and prompts the suspect consumer (i.e., the wearer of wearable 102) for a biometric sample (e.g., iris image or iris motion). At step 962, a transaction sample is captured by wearable 102 (e.g., the iris image data and/or iris motion data of the suspect consumer). At step 964, wearable 102 transmits the transaction sample to network 28.

At step 966, network 28 performs the authentication function. More specifically, network 28 compares the transaction sample of the suspect consumer to the previously-collected and stored reference sample(s). If the transaction sample suitably matches the reference sample (e.g., within some pre-defined threshold of comparison), network 28 authenticates the suspect consumer as cardholder 22 and, at step 968, network 28 sends authorization information to wearable 102. At step 970, wearable 102 transmits the credit card information to POS terminal 118, which subsequently starts the authorization process with network 28. As such, network 28 performs the authentication function for the payment card transaction under this embodiment, with wearable 102 transmitting the transaction sample directly to network 28 without intervention of POS terminal 118.

Figure 10:
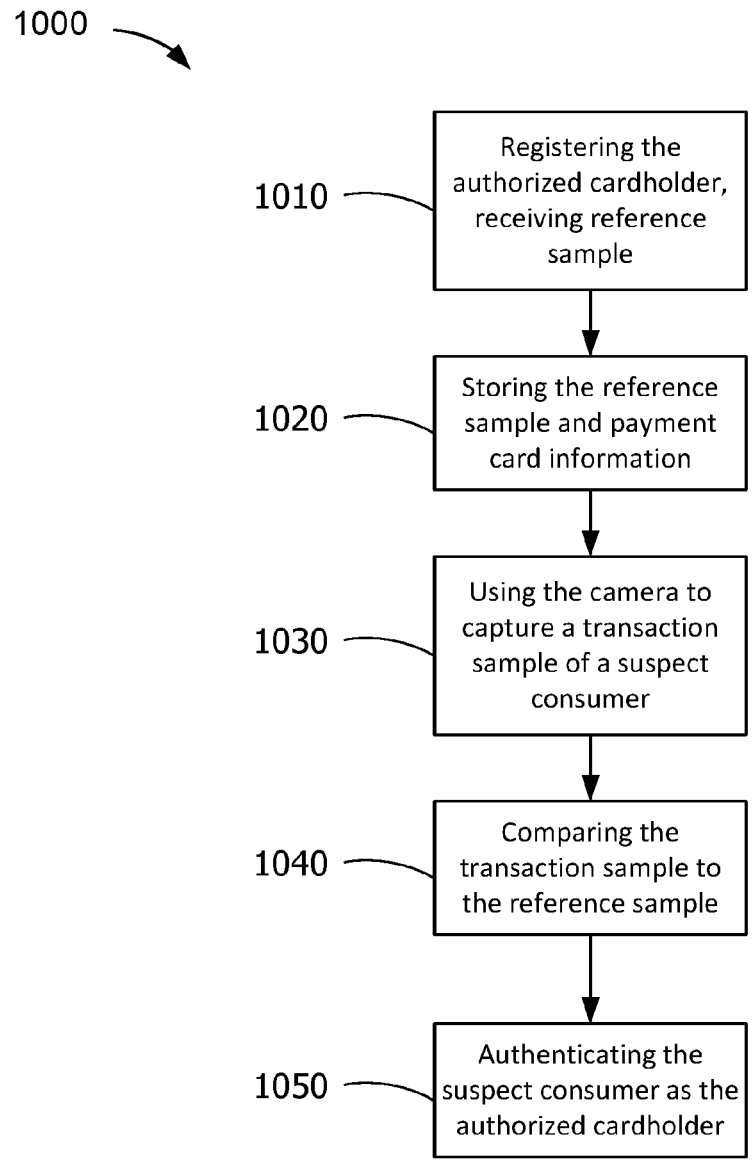

FIG. 10 is an example method 1000 for performing payment card transactions using wearable 102 (shown in FIGS. 2, 3, and 6-9) in transaction environment 20 (shown in FIG. 1). In the example embodiment, method 1000 is performed by a computing system such as server 112 (shown in FIG. 2), transaction processing system 122 (shown in FIGS. 3 and 6), or by computing device 810 (shown in FIG. 8). In some embodiments, method 1000 includes registering 1010 the authorized cardholder within a portable computer device by receiving a reference sample of the authorized cardholder, the portable computer device including a processor, a memory, and a camera. In some embodiments, registering 1010 includes using the camera to capture the reference sample of the authorized cardholder. Method 1000 also includes storing 1020, in the memory, the reference sample of the authorized cardholder and associated payment card information.

In the example embodiment, method 1000 includes using the camera to capture 1030 a transaction sample of the suspect consumer during the payment card transaction using the camera. In some embodiments, the portable computer device receives a prompt from a point of sale device to authenticate the suspect consumer after the suspect consumer initiates the payment card transaction, and the portable computer device is configured to respond to the prompt by causing the camera to capture 1030 the transaction sample. In some embodiments, capturing 1030 a transaction sample further includes capturing one or more of an iris image and an iris motion of the authorized cardholder.

Method 1000, in the example embodiment, includes comparing 1040, by the processor, the transaction sample to the reference sample stored in the memory. Method 1000 also includes authenticating 1050 the suspect consumer as the authorized cardholder based at least in part on the comparison. In some embodiments, method 1000 also includes transmitting authentication information and payment card information to a point of sale device of a merchant associated with the payment card transaction. In other embodiments, the portable computing device transmitting a message to a point of sale device that the suspect consumer has been authenticated as the authorized cardholder, the point of sale device generates and transmits a transaction authorization request message to an issuing bank associated with the payment card including an indicator that authentication has occurred.

Figure 11:
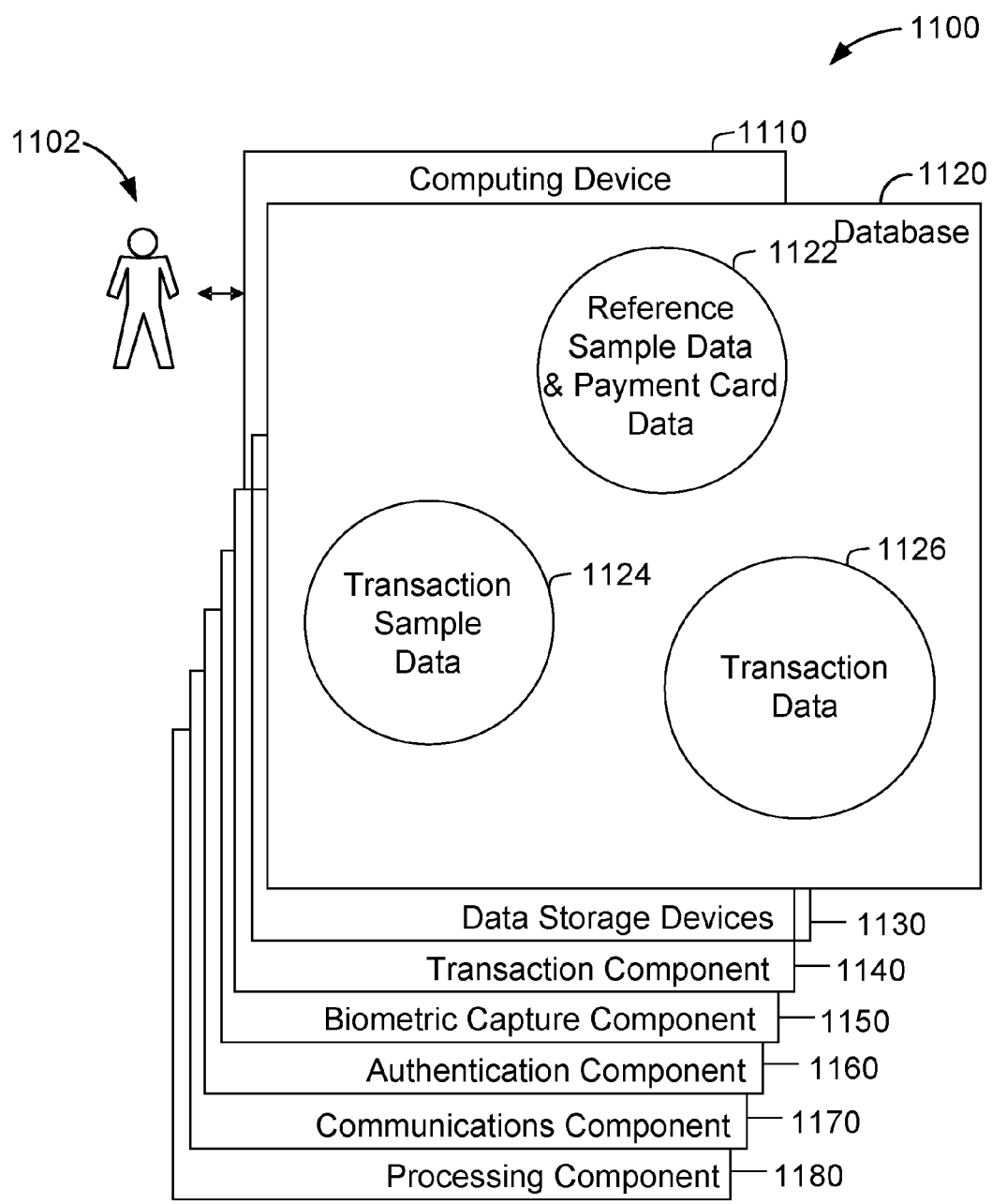

FIG. 11 shows an example configuration 1100 of a database 1120 within a computing device 1110, along with other related computing components, that may be used to perform payment card transactions using a wearable computing device. In some embodiments, computing device 1110 is similar to server system 112 (shown in FIG. 2), wearable computing device 102 (shown in FIGS. 2, 3, and 6-9), transaction processing system 122 (shown in FIGS. 3 and 6), and/or server system 301 (shown in FIG. 5). Database 1120 is coupled to several separate components within computing device 1110, which perform specific tasks.

In the example embodiment, database 1120 includes reference sample data and payment card data 1122, transaction sample data 1124, and transaction data 1126. In some embodiments, database 1120 is similar to database 120 (shown in FIG. 2). Reference sample data and payment card data 1122 includes information associated with reference samples of biometric data collected from authorized cardholders, along with associated payment card data of the cardholder's underlying payment cards. Transaction sample data 1124 includes information associated with biometric samples captured from suspect consumers during payment card transactions. Transaction data 1126 includes other data associated with payment card transactions.

Computing device 1110 includes the database 1120, as well as data storage devices 1130. Computing device 1110 also includes a transaction component 1140 for analyzing payment transaction data 1126. Computing device 1110 also includes a biometric capture component 1150 (e.g., camera 620, shown in FIG. 6) for capturing biometric reference and transaction samples. An authentication component 1160 is also included for comparing transaction samples to reference samples. A communications component 1170 is also included for communicating transaction data 1126, reference sample and payment card data 1122, and transaction sample data 1124 between components associated with the payment card transaction process. A processing component 1180 assists with execution of computer-executable instructions associated with the system.

As will be appreciated based on the foregoing specification, the above-described embodiments of the disclosure may be implemented using computer programming or engineering techniques including computer software, firmware, hardware or any combination or subset thereof, wherein the technical effect is a flexible system for performing payment card transactions using a wearable computing device. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for authenticating a suspect consumer as an authorized cardholder during a payment card transaction, said method comprising:
   capturing, using an application installed on a user portable computer device associated with the authorized cardholder, a first reference sample of the authorized cardholder, the user portable computer device including a processor and a memory;
   storing, in the memory of the user portable computer device, the first reference sample and associated payment card information;
   receiving, by the user portable computer device, a wireless signal from a point-of-sale (POS) device during the payment card transaction;
   activating, by the processor of the user portable computer device in response to the received wireless signal, the application on the user portable computer device, wherein the activated application prompts the suspect consumer to capture a first transaction sample of the suspect consumer;
   capturing, using the application on the user portable computer device, the first transaction sample of the suspect consumer;
   comparing, by the processor of the user portable computer device, the first transaction sample to the first reference sample stored in the memory; and
   transmitting, by the processor of the user portable computer device, the associated payment card information to the POS device in response to the first transaction sample matching the first reference sample.

2. The method of claim 1 further comprising:
   storing, in the memory, a second reference sample that is of a different type than the first reference sample;
   capturing, by the application on the user portable computer device, a second transaction sample of the suspect consumer during the payment card transaction;
   comparing, by the processor of the user portable computer device, the second transaction sample to the second reference sample stored in the memory; and
   transmitting the associated payment card information further in response to the second transaction sample matching the second reference sample.

3. The method of claim 2, wherein the first transaction sample is an iris image of the authorized cardholder and the second transaction sample is an iris motion of the authorized cardholder.

4. The method of claim 1, wherein the user portable computer device is a wearable computer device.

5. The method of claim 1, wherein the user portable computer device is configured to capture the first transaction sample by activating a camera of the user portable device to capture the first transaction sample.

6. The method of claim 1, wherein the point of sale device generates and transmits a transaction authorization request message to an issuing bank associated with the payment card information including an indicator that authentication has occurred.

7. A user portable computing device associated with an authorized cardholder and configured for authenticating a suspect consumer as the authorized cardholder during a payment card transaction, said user portable computing device comprising:
a memory;
a communication interface configured to communicate wirelessly with a point-of-sale (POS) device; and
a processor communicatively coupled to said memory and said communication interface, said processor programmed to:
capture, using an application installed on said user portable computing device, a first reference sample of the authorized cardholder;
store, in said memory of said user portable computing device, the first reference sample and associated payment card information;
receive a wireless signal from the point-of-sale (POS) device during the payment card transaction;
activate, in response to the received wireless signal, the application, wherein the activated application prompts the suspect consumer to capture a first transaction sample of the suspect consumer;
capture, using the application, the first transaction sample of the suspect consumer;
compare the first transaction sample to the first reference sample stored in said memory; and
transmit the associated payment card information to the POS device in response to the first transaction sample matching the first reference sample.

8. The user portable computing device of claim 7, wherein said user portable computer device is a wearable computer device.

9. At least one non-transitory computer-readable storage media having computer-executable instructions embodied thereon, wherein when executed by at least one processor of a user portable computer device, the computer-executable instructions cause the processor to:
capture, using an application installed on the user portable computer device, a first reference sample of the authorized cardholder, the user portable computer device associated with an authorized cardholder and including a memory coupled to the processor;
store, in the memory, the first reference sample and associated payment card information;
receive a wireless signal from a point-of-sale (POS) device during a payment card transaction initiated by a suspect consumer possessing the user portable computer device;
activate, in response to the received wireless signal, the application, wherein the activated application prompts the suspect consumer to capture a first transaction sample of the suspect consumer;
capture, using the application on the user portable computer device, the first transaction sample of the suspect consumer;
compare the first transaction sample to the first reference sample in the memory; and
transmit the associated payment card information to the POS device in response to the first transaction sample matching the first reference sample.

10. The computer-readable storage media of claim 9, wherein the computer-executable instructions further cause the processor to:
store, in the memory, a second reference sample that is of a different type than the first reference sample;
capture, by the application on the user portable computer device, a second transaction sample of the suspect consumer during the payment card transaction;
compare, by the processor of the user portable computer device, the second transaction sample to the second reference sample stored in the memory; and
transmit the associated payment card information further in response to the second transaction sample matching the second reference sample.

11. The computer-readable storage media of claim 10, wherein the first transaction sample is an iris image and the second transaction sample is an iris motion of the authorized cardholder.

12. The computer-readable storage media of claim 9, wherein the user portable computer device is a wearable computer device.

13. The computer-readable storage media of claim 9, wherein the computer-executable instructions further cause the processor to capture the first transaction sample using the application by activating a camera of the user portable computer device to capture the first transaction sample.

14. A computing device for authenticating a suspect consumer as an authorized cardholder during a payment card transaction, said computing device comprising a processor communicatively coupled to a memory and in communication with a user portable computing device, said computing device programmed to:
register the authorized cardholder within said computing device by receiving a plurality of reference samples of the authorized cardholder from the user portable computing device and associating payment card information with the plurality of reference samples, at least one reference sample of the plurality of reference samples collected from the authorized cardholder by an application installed on the user portable computing device, wherein the plurality of reference samples includes at least a first reference sample;
store, in the memory, the plurality of reference samples and the payment card information;
receive an authentication request including one or more transaction samples of the suspect consumer and transaction payment card information, wherein the one or more transaction samples are captured using the application on the user portable computing device;
compare each of the one or more transaction samples to the plurality of reference samples;
authenticate the suspect consumer as the authorized cardholder in response to the one or more transaction samples matching a corresponding reference sample;
transmit, in response to the authentication, authorization information to the user portable computing device; and
receive, from a point-of-sale (POS) device in communication with the user portable computing device, an authorization request message in response to the authorization information.

15. The computing device of claim 14, wherein receiving an authentication request further includes receiving the authentication request from the point of sale device, the point of sale device receiving the one or more transaction samples from the user portable computing device and transmitting the one or more transaction samples to the computing device.

16. The computing device of claim 14, wherein receiving a plurality of reference samples and payment card information further includes receiving the first reference sample and payment card information from a wearable computing device, the first reference sample including at least one of iris biometric data of the authorized cardholder.

17. The computing device of claim 14, wherein receiving an authentication request further includes receiving an authentication request from the user portable computing device.

18. The computing device of claim 14, wherein said computing device is further programmed to transmit a message to the point of sale device that the suspect consumer has been authenticated as the authorized cardholder.

19. The computing device of claim 14, wherein said computing device is further programmed to:
    transmit the authorization request message to an issuing bank associated with the payment card information including an indicator that authentication has occurred.

* * * * *